Nov. 25, 1969   R. P. MEYERS   3,479,840
TRUNNION SEAL FOR CARDAN-TYPE UNIVERSAL JOINT
Filed April 16, 1968

INVENTOR.
RICHARD P. MEYERS
BY
ATTORNEY 3,479,840
TRUNNION SEAL FOR CARDAN-TYPE
UNIVERSAL JOINT
Richard P. Meyers, Toledo, Ohio, assignor to Dana
Corporation, Toledo, Ohio, a corporation of Virginia
Filed Apr. 16, 1968, Ser. No. 721,703
Int. Cl. F16d 3/68
U.S. Cl. 64—17                                    7 Claims

ABSTRACT OF THE DISCLOSURE

A trunnion sealing device in a Cardan-type universal joint is provided in which a multi-lip, labyrinth type seal is assembled around the radially inner extremity of the trunnion on each journal cross arm in order to effect improved sealing characteristics between the external surface of the trunnion and the bearing race enclosing the trunnion.

---

This invention relates to seals in general and, more particularly, to a multi-lip, labyrinth type seal for use with a Cardan-type universal joint for sealing the opening between the trunnion of the journal cross and the open end of the trunnion bearing race rotatably mounting the journal cross.

Seals that close the opening between the trunnion and the open end of the bearing race are well known in the art and are provided to insure that the lubricant within the bearing race does not escape therefrom and that external contaminants may not enter the bearing race to inhibit the proper lubrication thereof.

Prior art means for sealing the opening between the open end of the bearing race and the trunnion have taken many forms of resilient single or multi-lip seals with metal backings. These devices however did not provide means to protect the resilient material from the actions of external contaminants by a labyrinth type arrangement, but used metallic elements solely to provide a preloaded element to maintain sealing contact by the resilient material after it becomes worn or deteriorated.

It is, therefore, an object of this invention to provide a seal including a resilient material for sealing the opening between the open end of the bearing race and the trunnion, which seal will retain lubricant within the bearing race and prevent the ingress of contaminants therein.

It is another object of this invention to provide means to prevent contaminants from reaching the resilient sealing material.

It is yet another object of this invention to provide such a seal which includes a metallic portion and a resilient portion, said metallic portion being in a press fit relationship with the bearing race to maintain the annulus of needle bearings from engaging the resilient portion.

Another object of this invention is to provide a multi-lip resilient seal which seeks a tighter sealing relationship with the trunnion under conditions of increasing speeds.

Yet another object of this invention is to provide a multi-lip seal which does not have to be removed when relubricating the needle bearings.

It is a still further object of this invention to provide a seal having a pair of metallic elements and a resilient element, the said metallic elements providing an envelope arrangement for a major portion of the resilient element so as to prevent the annulus of needle bearings from engaging the resilient portion and so as to prevent contamination of the resilient element by adverse exterior contaminants.

Figure 1:
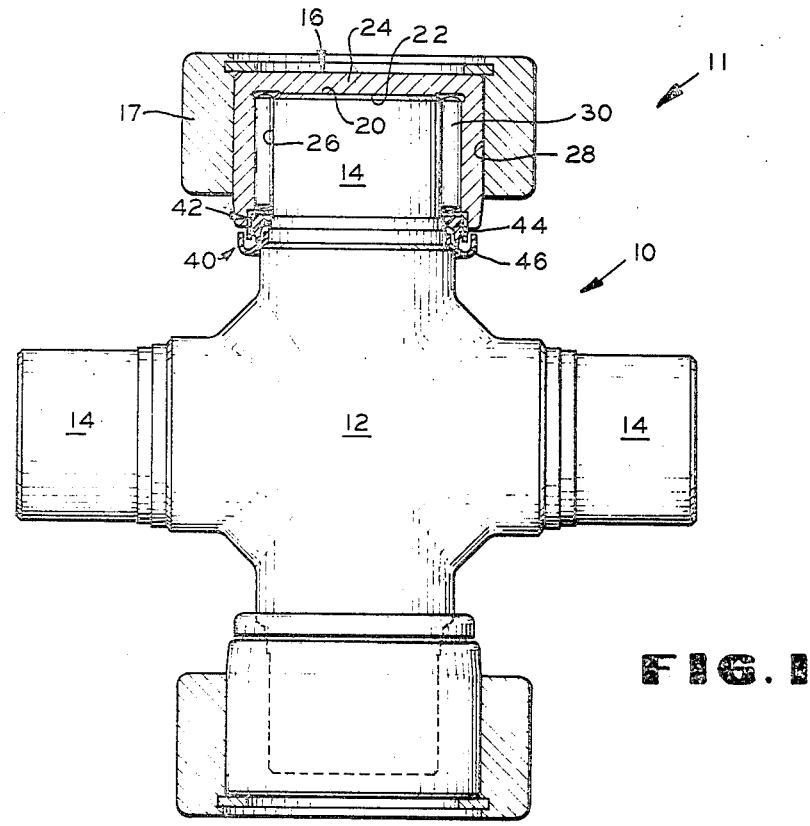
Figure 2:
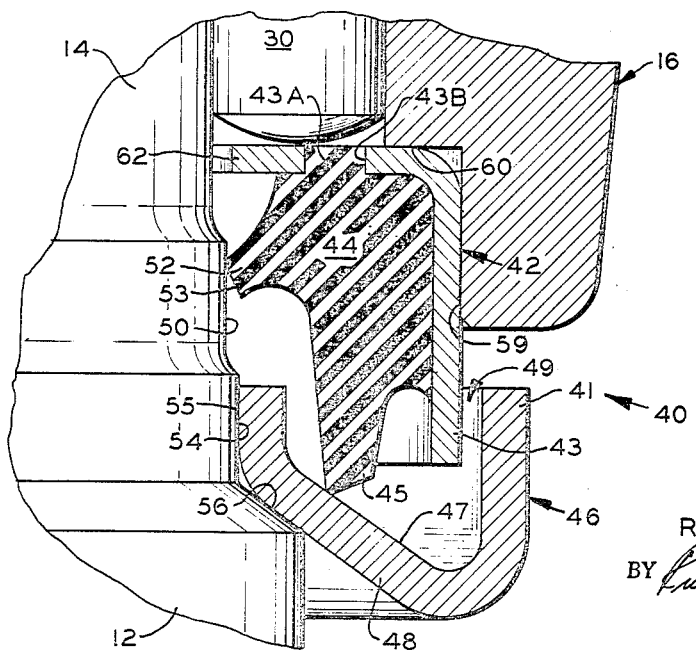

Other and further objects of this invention will become apparent upon a consideration of the specification when taken in conjunction with the drawings in which:

FIG. 1 is a fragmentary plan view, partially in section, showing the sealing means used in conjunction with a journal cross with bearing races mounted thereon; and FIG. 2 is an enlarged view of a portion of the opening between the open end of the bearing race and the trunnion showing the sealing means sealingly engaging the opening.

In the terminology used within the specification and claims appended thereto, the term axial shall be used in reference to the axis of the trunnion of the arm of the journal cross member, and the term radial shall be construed as extending perpendicularly relative to the axis of the journal cross arm.

Referring to FIG. 1, a journal cross 10 of a Cardan-type universal joint 11 is shown. This journal cross includes a central body portion 12 having four trunnions 14 extending therefrom in a circumferentially equally-spaced relationship. The trunnions 14 are generally cylindrical in shape and formed integral with the body portion 12 so as to form a unitized assembly therewith. Disposed over the axially outer end of the trunnion 14 is a cup-shaped bearing race 16. Each of these bearing races is adapted to be secured in a suitable manner to a yoke arm 17 (shown only fragmentarily) of a universal joint yoke member. Because the assembly of each of the bearing races 16 and the trunnions 14 is similar, the remainder of this description will refer to only a single bearing race and trunnion.

An axially outer face 20 of the trunnion 14 and an axially inner surface 22 of a cap or closed end 24 of the bearing race 16 rotationally engage each other in a thrusting relationship to limit movement of the trunnion 14 relative to the bearing race 16. An outer cylindrical periphery 26 forming the surface of the cylindrical trunnion 14 and an inner cylindrical surface 28 formed by the bearing race 16 are spaced from each other to provide for reception within this space of an annulus of needle bearings 30 adapted to rollingly engage the cylindrical surface 28 of the bearing race and the periphery 26 of the trunnion to thereby provide substantially frictionless rotation therebetween.

Referring to FIG. 2, a sealing means shown generally at 40 is provided to seal the opening which exists between the open end of the bearing race 16 and the trunnion 14. The sealing means 40 includes a first annular metallic portion 42 of generally inverted L-shaped cross section as seen in FIG. 9, an annular resilient elastomeric portion 44 which is bonded together with the first annular metallic portion 42 to form a unitized structure, and a second annular metallic portion 46 of generally U-shaped cross section which receives within its bight a portion of the elastomeric member 44.

The radially inward end of the trunnion 14 is provided with three sealing surfaces. The first sealing surface 50 is located towards the axially outer end of the trunnion and engages in a sealing relationship with a first annular lip 52 formed on the inner periphery of the resilient elastomeric portion 44. The second sealing surface 54 is located axially inward from and adjacent to surface 50, is slightly larger in diameter than surface 50, and engages a laterally and radially innermost surface 55 of the U-shaped metallic portion 46 in a press fit relationship so that the U-shaped metallic portion 46 rotates in unison with the trunnion 14. Adjacent the second sealing surface 54 on the trunnion 14 is a third sealing surface 56 cut on an acute angle relative to the axis of the trunnion 14, upon which the innermost surface of the U-shaped metallic portion 46 is seated. The surface 56 also provides for a smooth transition between the central body portion 12 and the trunnion and also provides an abutment area which is necessary to assure proper spacing axially inwardly for the U-shaped metallic portion 46 of the sealing means 40 relative to the axial outer face 20 of the trunnion 14. A second annular lip 45 on the resilient elastomeric portion 44 also sealingly engages an acutely angled leg 48 of the U-shaped metallic portion 46. It should be noted that each of the annular lips 52 and 45 are formed as edges (see FIG. 2) since initial abutting contact of these lips is thereby "line contact" this insures the absence of rounded conrners and poor sealing.

The open end of the bearing race 16 is counterbored to provide an axially extending annular surface 59 and a laterally or radially extending shoulder 60. The L-shaped metallic portion 42 is pressed into the bearing race with an axially extending leg 43 of it in a press fit relationship with the surface 59, until a laterally extending leg 62 of the L-shaped metallic portion 42 abuttingly engages surface 60. The surface 60 locates the L-shaped metallic portion 42 in its proper axially inward position from the radial outer face 20 of the trunnion 14. The L-shaped metallic portion 42, in turn, positions the needle bearings 30 in the axial direction by engaging the same when in this position.

In the assembled relationship of the sealing means as shown in FIG. 2, the first annular lip 52 is biased, by the sealing surface 50, axially outward in a direction parallel to the axis of the trunnion 14. As the universal joint 10 increases in speed the centrifugal force on the lip tends to throw it axially further outward, whereby it seeks or is pressed into a tighter sealing relationship with sealing diameter 50. In this biased position, the lip 52 deforms in a radially inward direction so that a radially outwardly sloping face 53 of it more fully engages the sealing surface 50 thereby providing the aforementioned tighter sealing relationship. During lubrication, however, or when an excess of lubricant is in the universal joint 10 the pressurized lubricant is capable of forcing the annular lip 52 axially inwardly and radially outwardly so that a clearance is provided between it and surface 50 for the escape of lubricant.

In the same manner, the second annular lip 45 is biased by an acute angled surface 47 formed on acutely angled leg 48 of the U-shaped metallic portion such that escaping lubricant can be forced between the lip 45 and the angled surface 47 of the U-shaped metallic portion. Any limited amounts of contaminants, such as dirt or mud, reaching and impinging against the lip 45 cause the lip to seal more tightly against the acutely angled surface 47 thereby preventing these contaminants from reaching the annular lip 52.

Impingement of contaminants against the lip 47 is severely limited by the following arrangement. The radially extending leg 43 of the L-shaped metallic portion 42 is nested within the U-shaped metallic portion 46 in a manner to form a circumferentially extending gap 49, between the radially inward extending leg 43 of the L-shaped portion 42 and the radially outward extending leg 41 of the U-shaped portion 46. This gap and the tortuous path between it and the elastomeric portion 44 thereby acts as a labyrinth type seal between the respective metallic portions to help prevent contaminants from reaching the resilient elastomeric portion 44 of the seal. The U-shaped metallic portion 46 additionally covers and protects the elastomeric portion 44 so that the major portion of atmospheric contaminants are unable to directly come into contact with this element to cause deterioration of it and thereby and shortened joint life.

As was mentioned previously, the first annular metallic portion 42 and the elastomeric portion 44 are bonded together in a unitary assembly. The effect of this bonding may be advantageously increased by providing a series of projecting knobs 43A on the elastomeric portion 44 which extend into a series of corresponding holes 43B formed in the metallic portion 42. The interlocking fit provided thereby is extremely secure and may be utilized in the event that operational problems are engendered by utilizing only a normal bond between these two parts.

It is to be understood that modifications in the structure herein disclosed may be affected without departing from the scope of this invention as defined by the attached claims.

What is claimed is:

1. A trunnion seal for sealing the space between a bearing race and a trunnion on a journal cross for a universal joint comprising in combination: (a) an annular inverted L-shaped cross section plate seated between the bearing race and trunnion, (1) said plate having a leg extending substantially parallel to the axis of the trunnion, (2) said plate have a leg extending substantially perpendicular ot the axis of the trunnion, (b) an annular member, U-shaped in cross section, seated adjacent to the trunnion and axially inwardly of the plate, member, (c) an annular elastomeric member encircling the trunnion, (1) said annular elastomeric member having an annular lip extending radially inwardly to seal the space between the bearing race and trunnion, (2) said elastomeric member having a second annular lip extending axially inwardly into the annular U-shaped member.

2. A trunnion seal as described in claim 1, where one leg of the plate has a plurality of holes therein.

3. A trunnion seal for sealing the space between a bearing race and a trunnion on a journal cross for a universal joint comprising in combination: (a) an annular metallic plate encircling the trunnion and including a portion generally disposed substantially parallel to the axis of the trunnion, (b) an annular elastomeric member encircling the trunnion between the trunnion surface and the annular metallic plate, said elastomeric member being bonded to the radially inner surface of the annular metallic plate, (1) said elastomeric member having a first annular lip extending radially inwardly in contact with the trunnion, (2) said elastomeric member having a second annular lip extending axially inwardly from the elastomeric member, (c) an annular metallic member, U-shaped in cross section, encircling the trunnion at its axially inner extremity with the open end of the metallic member being disposed in a direction towards the axially outer portion of the trunnion, (1) said U-shaped annular member receiving the second annular lip member of the elastomeric member and said parallel portion of said annular metallic plate in its opening, thereby creating a labyrinth structural relationship for the seal.

4. A seal as defined in claim 3 in which a face extending from the first annular lip of the elastomeric member slopes radially outwardly from the periphery of the trunnion.

5. The combination set out in claim 3 wherein said annular metallic member is disposed with a portion thereof abutting said trunnion member.

6. The combination set out in claim 1 wherein bearings are disposed in said bearing race and said annular metallic plate provides positive spacing for said bearing members.

7. The combination set out in claim 3 wherein said annular metallic plate is L-shaped in cross section and said elastomeric member is disposed generally in the apex of said L-shape.

References Cited

UNITED STATES PATENTS

| | | | |
|---|---|---|---|
| 2,285,623 | 6/1942 | Swenson et al. | 64—17 |
| 2,338,169 | 1/1944 | Dunn | 64—17 |
| 2,802,351 | 8/1957 | Anderson | 64—17 |
| 2,896,433 | 7/1959 | Hempel | 64—17 |
| 3,200,615 | 8/1965 | Stokely | 64—17 |

HALL C. COE, Primary Examiner

U.S. Cl. X.R.

277—65, 95